United States Patent
Carswell, Jr. et al.

[11] 3,756,069
[45] Sept. 4, 1973

[54] GAS ANALYZER APPARATUS

[75] Inventors: John D. Carswell, Jr., Bernardsville, N.J.; George W. Gorman, Decatur, Ga.

[73] Assignees: Gow-Mac Instrument Company, Incorporated, Madison, N.J. ; by said Carswell; The United States of America as represented by the Secretary of the Department of Health, Education and Welfare, Washington, D.C. ; by said Gorman

[22] Filed: Aug. 4, 1971

[21] Appl. No.: 168,994

[52] U.S. Cl. .............................................. 73/27 R
[51] Int. Cl. .......................................... G01n 27/04
[58] Field of Search ...................... 73/27 R, 23, 25; 338/34; 23/232 E, 254 E, 232 GC

[56] References Cited
UNITED STATES PATENTS

| 2,042,646 | 6/1936 | Willenborg | 23/232 E |
| 2,591,759 | 4/1952 | Zaikowsky | 73/27 R |
| 3,354,052 | 11/1967 | Williams | 73/25 X |

Primary Examiner—Richard C. Queisser
Assistant Examiner—Stephen A. Kreitman
Attorney—R. B. Havill

[57] ABSTRACT

Accuracy of thermal conductivity gas analysis is enhanced by bubbling a sample gas and a reference gas through a common reservoir to saturate the gases at equal temperature and pressure. The saturated gases are maintained at equal pressures and at a temperature exceeding their dew points until the two gases are conveyed past filaments of a thermal conductivity detector cell.

9 Claims, 4 Drawing Figures

INVENTORS J.D. CARSWELL, JR.
G.W. GORMAN
BY Richard B. Havill
ATTORNEY

Patented Sept. 4, 1973   3,756,069

GAS ANALYZER APPARATUS

BACKGROUND OF THE INVENTION

1. Field of the Invention

The invention is a gas analyzer apparatus that is more particularly described as a thermal conductivity gas analyzer.

2. Description of the Prior Art

In the prior art, thermal conductivity gas analysis apparatus includes a pair of conduits, or tubes, for conveying sample and reference gases to different chambers of a thermal conductivity cell, or detector. The sample gas includes a carrier gas and an unknown quantity of a solute gas. The reference gas often is the same type of gas as the carrier gas of the sample.

Determination of the quantity of the solute gas is accomplished accurately by processing the sample and reference gases at equal flow, pressure, and temperature.

The thermal conductivity cell, or detector, of the apparatus is a metallic block having a pair of gas flow passages for conveying, respectively, the sample and reference gases to detector elements. Two of the detector elements, or hot wire filaments, are positioned along each of the passages so that the elements are exposed either directly or indirectly to the flowing gas. The filaments of the detector are fabricated from material having a high resistivity and a high temperature coefficient of resistance.

The four filaments of the detector are connected in an electrical bridge circuit in which the two filaments exposed to each gas are positioned on opposite sides of the bridge. A direct current power supply is applied across one diagonal of the bridge for establishing a quiescent current through the four filaments to heat them to an initial temperature above the gas temperature.

Loss of heat from each filament depends upon the thermal conductivity of the gas surrounding the filament. As the composition of the surrounding gas varies, the thermal conductivity thereof also varies. Thus changes in the composition of the gas cause heat loss from the filament to fluctuate.

Fluctuations of the heat loss cause the temperature of the filaments to vary over a small range. Because of the high temperature coefficient of resistance in the filaments, the temperature fluctuations can substantially change the resistance of the filaments. Such changes of resistance cause the current conducted through the filaments to fluctuate from the value of the quiescent current.

These fluctuations of current unbalance the bridge and can be detected by a voltmeter connected across the bridge on a diagonal opposite to the diagonal of the power supply. This meter has a face calibrated to show the quantity of solute in the sample gas being analyzed. As the fluctuations of the current change the meter reading, the quantity of solute gas is read directly from the face of the meter.

This method of measuring the quantity of solute gas in the sample is very sensitive to differences between the rates of flow, the temperatures, the pressures, and the moisture contents of the sample and reference gases. If such differences occur, they are interpreted by the detector and the meter as changes in the quantity of solute gas in the sample.

Various methods have been used to reduce the possibility of differences of flow, temperature, pressure, and moisture content of the two gases.

One method, used for reducing differences in the moisture contents of the sample and reference gases, is accomplished by drying each of the gases in a separate moisture trap. However, it is known that such traps may dry the two gases unequally. Such unequal drying causes erroneous quantity readings.

Another method, used for reducing differences in the moisture content, is accomplished by saturating each of the gases in separate saturators, however, such separate saturators can collect different amounts of condensation from the two gases. After collecting condensation for a while, the columns of water rise to different heights in the respective saturators. Such different height columns subject the two gases to unequal pressures. These different pressures also cause erroneous quantity readings.

If saturated gas passes through a flowmeter used for determining and controlling the rate of flow, moisture can condense within the flowmeter causing it to malfunction and produce erroneous readings.

Additionally moisture from saturated gas can condense within tubing used for conveying the gas from the saturator to the detector. Any differential condensation can cause erroneous quantity readings.

Therefore a problem exists in conveying the sample and reference gases to the thermal conductivity detector with equal rate of flow, temperature, pressure, and moisture content so that inequalities of those characteristics do not affect the determination of the quantity of the solute gas in the sample.

SUMMARY OF THE INVENTION

Therefore it is an object of this invention to develop an improved thermal conductivity gas analyzer.

It is a further object to improve the accuracy of thermal conductivity gas analyzers.

These and other objects of the invention are realized in a thermal conductivity gas analyzer which conveys sample and reference gases through a common reservoir for saturating the gases equally at the same temperature and pressure. The saturated gases are conveyed to the filaments in a thermal conductivity detector cell while being maintained at equal pressures and at a temperature exceeding their dew points.

It is a feature of the invention to pass the sample and the reference gases through the common reservoir to saturate the gases equally at the same pressure and temperature even after the saturator has operated for several hours.

It is another feature to maintain the saturated gases at equal pressure and at equal rates of flow until the gases pass through the detector cell.

It is a further feature to maintain the saturated gases at equal temperatures above their dew points until the gases pass through the detector cell.

BRIEF DESCRIPTION OF THE DRAWINGS

A better understanding of the invention may be derived from the detailed description following if that description is considered with respect to the attached drawings wherein.

DETAILED DESCRIPTION

Figure 1:
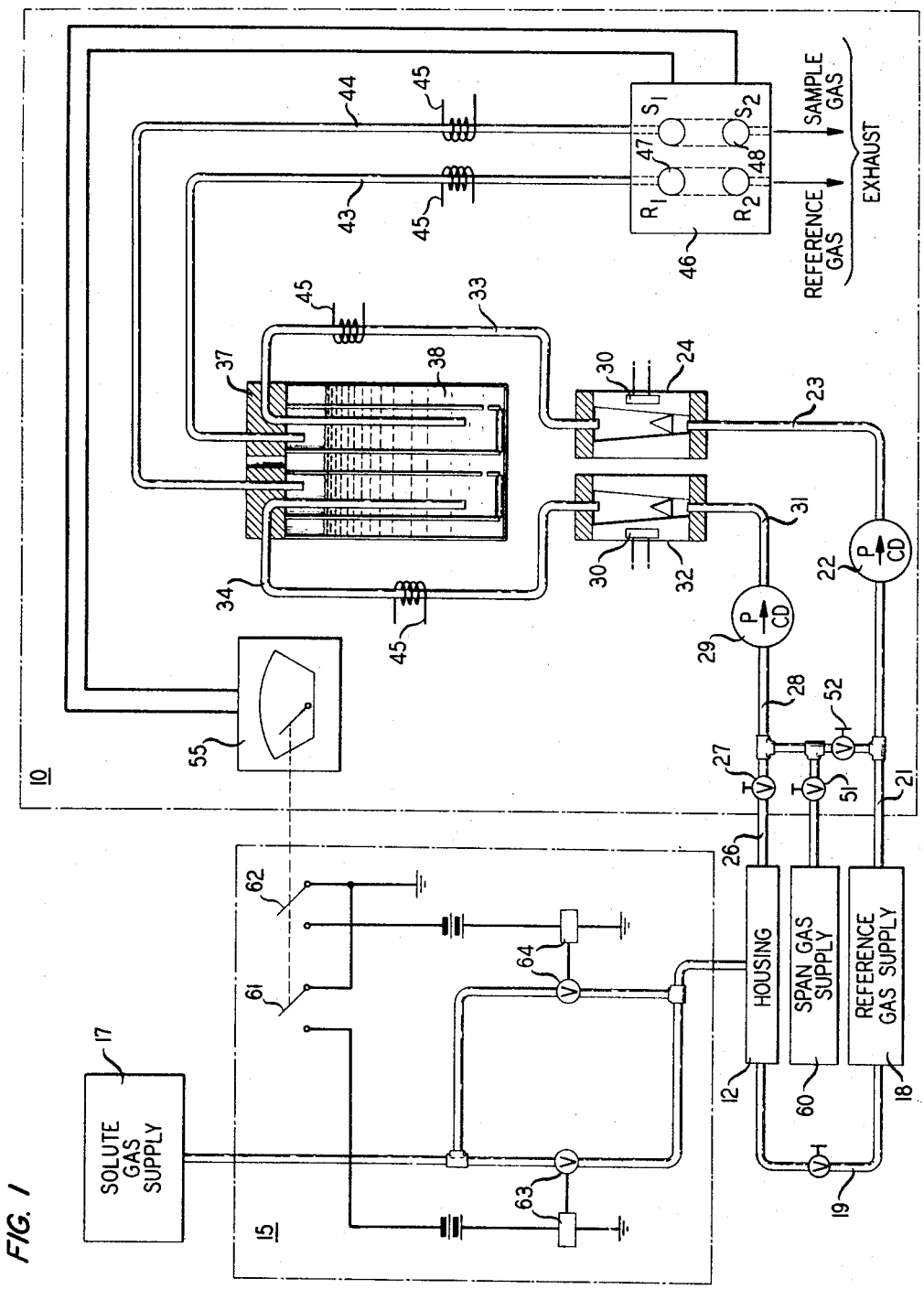
FIG. 1 is a schematic diagram of a thermal conductivity gas analysis apparatus in accordance with the invention.

Referring now to FIG. 1, there is shown a schematic diagram of a gas analyzer 10 for determining the quantity of a solute gas dissolved in a solvent gas within a housing, or chamber 12. A control system 15, which is responsive to the quantity of solute gas from a supply 17 to the housing 12. The solvent gas, stored in a reference gas supply 18, is carried to the housing 12 by any suitable means, such as the tubing 19.

In actual practice, the reference gas supply 18 and the method of carrying the solvent gas to the housing 12 may vary widely. For instance, the solvent gas often is room air which surrounds the entire housing 12. The housing 12 is constructed so that air flows into the chamber making the atmosphere within the chamber mostly room air.

The solvent gas is also supplied, as a reference gas, to the gas analyzer 10 by way of a tube 21. A pump 22 forces the reference gas, or air, to flow along tube 23 into a flowmeter 24.

A sample of the gas mixture contained in the housing 12 can be supplied to the gas analyzer 10 by way of a tube 26. In the analyzer, a shut off valve 27 and a tube 28 carry the sample gas to another pump 29, which forces the sample gas to flow through a tube 31 into another flowmeter 32. The sample gas may be a gas such as carbon dioxide having a thermal conductivity nearly equal to the thermal conductivity of the reference gas which may be air.

The pumps 22 and 29 advantageously may be vibrator type diaphragm pumps providing a constant flow rate of approximately 200 cubic centimeters of gas per minute.

The flowmeters 24 and 32 advantageously are tapered tube flowmeters, each having a metering valve at its gas inlet and each being heated above the temperature inside of the housing 12. The metering valves are adjusted so that equal volumes of gas flow through the two flowmeters.

Figure 2:
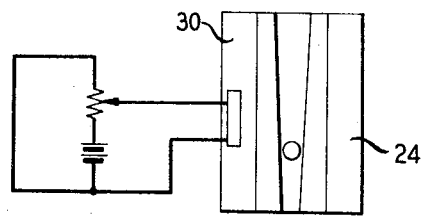
FIG. 2 is an illustration of a flowmeter arranged with a heating unit.

As shown in FIG. 2, the flowmeter 24 has a controllable electric heater element 30 inserted inside of its housing. Such a heater element is mechanically attached to the housing of each of the flowmeters 24 and 32 in FIG. 1 for maintaining them at a high ambient temperature so that moisture contained in the sample gas and the reference gas will not condense within the flowmeters 24 and 32. Any condensation in the flowmeters can adversely affect the accuracy of flow readings.

Gas outlets of the flowmeters 24 and 32 are piped by way of tubes 33 and 34 into a saturator 37 for saturating the sample gas and the reference gas at the same temperature and the same pressure.

Figure 3:
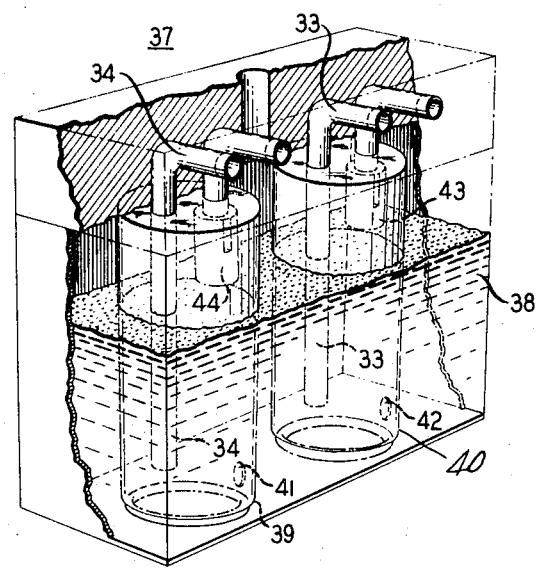
FIG. 3 is an illustration of a common reservoir saturator used in the apparatus of FIG. 1.

A more detailed view of the saturator 37 is shown in FIG. 3, where the input tubes 33 and 34 are shown entering at the top and bending down toward the bottom of the saturator.

The saturator 37 includes a common reservoir 38 which is filled with some fluid, such as water. Placed inside of the reservoir are two cylindrical saturator columns 39 and 40 that are sealed to the top of the saturator and to the bottom of the reservoir 38. Bleeder holes 41 and 42, located near the bottoms of the columns 39 and 40, enable the fluid to fill the columns equally at all times.

Gases, entering the saturator 37 by way of tubes 33 and 34, are emitted from the bottom ends of those tubes and bubble to the surface. Slotted collector tubes 43 and 44 located above the fluid surface collect the gases which accumulate in the space above the fluid surface in the columns 39 and 40. The gases thus collected in the spaces at the top of the separate columns are carried away through the collector tubes 43 and 44, shown in FIG. 1, to a gas thermal conductivity cell 46. The ends of the collector tubes 43 and 44 in the top of the columns 39 and 40 may be any one of a number of shapes as long as each one of the collector tubes collects all of the gas bubbled in from a separate one of the emitter tubes 33 and 34.

As a result of the gases bubbling up through the water in the common reservoir 38, each gas is saturated equally with the water. The gases are held at equal temperature and pressure because the gases are exposed to the same reservoir of water. Even though the analyzer 10 is allowed to run unattended for periods as long as 24 hours or more, the temperature and pressure on each of the gases remains equal. Any condensation from the gases or evaporation from the reservoir changes the water level of the entire reservoir and therefore affects the reference and sample gases equally.

If metallic tubing is used for tubes 33, 34, 43, or 44, it is advantageous to heat those tubes to a uniform temperature above the dew point of the gases. This assures that the gases flow at uniform temperature from the flow-meters 24 and 32 through the saturator 37 to the detector 46. Electric heating tape 45 attached to the tubes 33, 34, 43 and 44 maintains a uniform temperature in those tubes.

Thermal conductivity cell 46 includes a first chamber 47 for carrying the reference gas to two hot wire filaments $R_1$ and $R_2$ and a second chamber 48 for carrying the sample gas to two additional hot wire filaments $S_1$ and $S_2$. All of the filaments $R_1$, $R_2$, $S_1$, and $S_2$ may advantageously be rhenium tungsten filaments that are inserted into the chambers so that the reference and sample gases are exposed to the filaments by diffusion rather than by direct flow.

Figure 4:
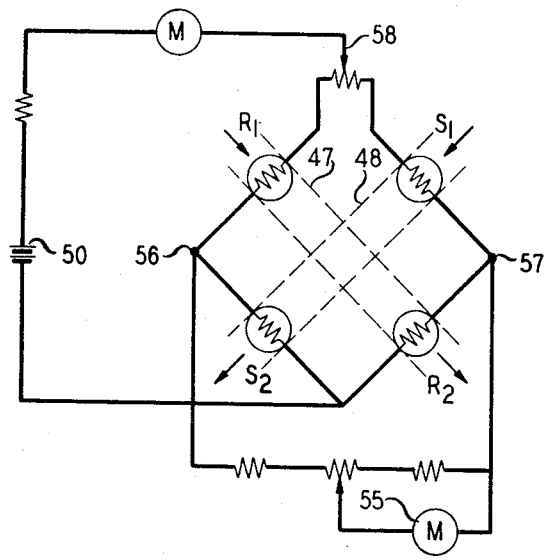
FIG. 4 is a schematic diagram of a bridge circuit used in the gas analysis apparatus.

The filaments $R_1$, $R_2$, $S_1$, and $S_2$ are connected in an electrical bridge circuit, as shown in FIG. 4. A battery 50 supplies operating power to the bridge arrangement. Adjustable slidewire resistors are included within the bridge for balancing the bridge. A voltmeter 55 is shown connected across one diagonal of the bridge between nodes 56 and 57. When no current flows in that branch, the voltmeter 55 reads zero.

Before the apparatus is used for determining the quantity of solute gas in the sample obtained from the housing 12 in FIG. 1, it is essential to calibrate the voltmeter 55. Such calibration is accomplished in the following manner.

Valves 27 and 51 are closed, and valve 52 is opened to accomplish the first step of calibration. The reference gas is then conveyed through both paths to the flowmeters 24 and 32. The flow of reference gas is equalized in both paths by means of the metering valves in the flowmeters. Both streams of reference gas are bubbled through the saturator 37 and are conveyed to the separate chambers of the cell 46.

In the thermal conductivity cell 46, the filaments are exposed to identical gases having identical thermal conductivity. Slidewire 58, in FIG. 4, is adjusted so that no current flows through the branch between nodes 56 and 57 and so that the bridge operates in its quiescent condition. The voltmeter 55 reads zero indicating that there is no solute gas conveyed past elements $S_1$ and $S_2$.

Once the apparatus thus is adjusted for zero, a span gas and the reference gas are conveyed to the analyzer 10. Span gas is a solvent gas that contains a known quantity of the solute gas to be mixed in the atmosphere within the housing 12. The span gas from the supply 60, in FIG. 1, is conveyed to the analyzer 10 by opening valve 51 so that the span gas flows through tube 28, pump 29, and tube 31 to the flowmeter 32. By closing valve 52 the reference gas flows only through tube 21, pump 22, and tube 23 to the flowmeter 24. Valve 27 remains closed.

The span gas and the reference gas thus entering the analyzer 10 flow by way of separate paths through the flowmeters and the saturator to the cell 46.

Once the span gas and the reference gas are conveyed to the cell 46, the thermal balance of the filaments will change and cause the bridge to unbalance. Such unbalance makes the voltmeter 55 deflect from zero. At the point of deflection, the face of the meter is marked with a value equal to the known per cent of solute in the span gas. Thus the zero and an upscale reading are accurately determined on the face of the voltmeter 55 completing the calibration of the meter.

Full scale meter deflection usually is limited to approximately 10 per cent solute gas in the solvent gas. The scale can be divided into equal units because changes of thermal conductivity are linear over the range of solute gas used.

After the meter is calibrated by the reference gas and span gas, a sample of gas from the housing 12 can be analyzed by concurrently conveying the reference gas from the supply 18 and the sample gas from the housing 12 to the cell 46. This is accomplished by closing the valve 51 and opening the valve 27. Valve 52 remains closed. The sample gas is conveyed through the valve 27, the pump 29, and the flow-meter 32 to the saturator 37. The reference gas is conveyed through the pump 22 and the flowmeter 24 to the saturator 37. Both gases are bubbled through the common reservoir 38 and are conveyed by way of the separate collector tubes 43 and 44 to the detector cell 46 for analysis.

Because of differences in the thermal conductivity of the sample gas and the reference gas caused by the quantity of solute in the sample gas, the temperature of filaments $S_1$ and $S_2$ fluctuate with respect to the temperature of the filaments $R_1$ and $R_2$. This fluctuation of temperature changes the resistance of the filaments $S_1$ and $S_2$ with respect to the resistance of the filaments $R_1$ and $R_2$, and the bridge is unbalanced. As a result the voltmeter 55 deflects a distance dependent upon the quantity of solute gas in the sample gas.

As shown in FIG. 4, the sample gas filaments $S_1$ and $S_2$ are located in opposite branches of the bridge. The reference gas filaments $R_1$ and $R_2$ are also placed in opposite branches of the bridge. Chambers 47 and 48 of the detector cell 46 are indicated in FIG. 4 by dashed lines and arrows showing the direction of gas flow therethrough.

This arrangement for exposing the sample and reference gases to the filaments causes the filaments to change temperature in response to variations in the thermal conductivity of the gases, as previously discussed. In particular, the sample filaments increase in temperature as the amount of carbon dioxide in the sample gas increases because the thermal conductivity of the carbon dioxide is less than the thermal conductivity of air. The positive temperature coefficient of resistance of the filament material causes the resistance of the sample filaments $S_1$ and $S_2$ to increase with increasing temperature.

Such an increase in the resistance of the sample filaments with respect to the reference filaments causes current flow in the meter branch of the bridge. This current is manifested as a voltage drop between nodes 56 and 57 in the bridge. This voltage drop is measured by the voltmeter 55.

The parts of the gas analyzer described previously comprise the basic gas analysis apparatus. In FIG. 1, additional apparatus is included for controlling the amount of solute gas that is mixed with the reference gas in the housing 12.

Thus in FIG. 1 the meter movement of voltmeter 55 is arranged to operate a pair of limit switches 61 and 62 in the control system 15. The switches 61 and 62, respectively, control slow flow and fast flow solenoid valves 63 and 64.

The control system 15 operates so that an amount of solute gas can be added rapidly to the housing 12 and so that the amount of solute gas in the housing can be maintained automatically between predetermined lower and upper limits.

Operation of the fast flow valve 64 enables the chamber to fill rapidly with solute gas when the solute gas is first added to the housing 12 or when the amount of solute gas in the housing 12 falls below the predetermined lower limit. Thus the limit switch 62 is set to operate the solenoid and open the fast flow valve 64 when the amount of solute gas in the housing is less than the predetermined lower limit. The limit switch 62 also is set to close the fast flow valve 64 when the amount of solute gas in the housing 12 is greater than the predetermined lower limit.

Operation of the slow flow valve 63 maintains the amount of solute gas inside of the housing 12 within the predetermined lower and upper limits. Thus the limit switch 61 is set to operate the solenoid and open the slow flow valve 63 when the amount of solute gas in the housing 12 is less than half way between the lower and upper limits. Switch 61 also is set to disable the solenoid and close the slow flow valve 63 when the amount of solute gas inside of the housing is greater than half way between the lower and upper limits.

Separate branches of tubing connect the solute gas supply 17 to the valves 63 and 64 and thence to the housing 12 for supplying solute gas to the housing whenever one or both of the valves 63 and 64 are open. Thus when the meter 55 indicates that the per cent of solute gas has decreased toward or below the predetermined lower limit, additional solute gas is supplied from the supply 17 through one or both of the valves 63 and 64 to the housing 12. Thus additional solute gas is supplied to the housing 12 until the per cent of solute gas in the housing 12 has increased somewhat above the lower limit. Then the solute gas from the supply 17 is cut off by the valves 63 and 64.

The foregoing discussion describes a control system operating in response to the gas analyzer 10, which is arranged to accurately determine the quantity of solute gas in the solvent gas by assuring that sample and reference gases are equally saturated at equal temperatures and pressures and are held above their dew points until after the gases pass the filaments in the detector cell 46.

The above detailed description is illustrative of an embodiment of the invention, and it is understood that additional embodiments thereof will be obvious to those skilled in the art. All of these embodiments are considered to be within the scope of the invention.

What is claimed is:

1. A gas mixture analyzer comprising
   a thermal conductivity detector cell having first and second gas chambers, each chamber enclosing a pair of electrical conductors,
   means for conveying a first gas to the conductors in the first chamber,
   means for conveying a second gas to the conductors in the second chamber,
   means for heating the gas conveying means, and
   a common reservoir interposed in the first and second gas conveying means for saturating the first and second gases at equal temperature and equal pressure.

2. A gas analyzer in accordance with claim 1, wherein
   the means for conveying the first and second gases each comprise means for determining the rate of gas flow, and
   the heating means includes means for heating the rate of flow determining means to a temperature above the dew point of the gases.

3. A gas analyzer in accordance with claim 1 wherein the common reservoir comprises:
   means for containing a fluid,
   first and second collectors,
   means for bubbling the first gas through the fluid to the first collector, and
   means for bubbling the second gas through the fluid to the second collector.

4. A gas analyzer in accordance with claim 3 wherein
   the means for conveying the first and second gases each comprises means for determining the rate of gas flow therethrough, and
   the heating means include means for heating the rate of flow determining means to a temperature above the dew point of the gases.

5. A gas analyzer in accordance with claim 4 wherein the conductors, enclosed in the first and second chambers, interconnect in an electrical bridge circuit for controlling a meter in response to changes of composition of the second gas with respect to the first gas.

6. A thermal conductivity gas analyzer comprising
   first and second filaments in a first chamber,
   third and fourth filaments in a second chamber,
   means for connecting the first, second, third, and fourth filaments in a bridge circuit,
   a gas saturator including a common reservoir having a plurality of paths for saturating gases,
   means for conveying a first gas at a predetermined rate through one path of the saturator to the first chamber,
   means for conveying a second gas at the predetermined rate through another path of the saturator to the second chamber, and
   means interposed along both conveying means for heating the first and second gases above their dew points.

7. A gas analyzer in accordance with claim 6 wherein the means for conveying gases each includes:
   means for emitting the gas into an enclosed column of fluid within the reservoir,
   means for collecting all of the gas emitted within the column, and
   fluid means for filling the common reservoir and the columns to a uniform level.

8. A gas analyzer in accordance with claim 7 wherein
   the conveying means each comprises means for determining the rate of flow of gas, and
   the heating means are attached to the rate of flow determining means for heating the gases above their dew points.

9. A gas mixture analyzer comprising
   a thermal conductivity detector cell having first and second gas chambers, each chamber enclosing a pair of electrical conductors,
   means for conveying a first gas to the conductors in the first chamber,
   means for conveying a second gas to the conductors in the second chamber, and
   a common reservoir interposed in the first and second gas conveying means for saturating the first and second gases at equal temperature and equal pressure.

* * * * *